United States Patent [19]

Honjo

[11] 4,404,438
[45] Sep. 13, 1983

[54] STRUCTURE FOR MOUNTING COLUMN SWITCHES FOR VEHICLES

[75] Inventor: Kazumi Honjo, Tokyo, Japan
[73] Assignee: Niles Parts Co., Ltd., Tokyo, Japan
[21] Appl. No.: 357,909
[22] Filed: Mar. 15, 1982
[30] Foreign Application Priority Data
  Mar. 3, 1982 [JP] Japan .................................. 57-33249
[51] Int. Cl.³ ............................................ H01H 9/02
[52] U.S. Cl. .............................. 200/61.54; 200/61.27
[58] Field of Search ................ 200/61.54, 61.27–61.38
[56] References Cited
   U.S. PATENT DOCUMENTS
   2,800,540  7/1957  Wagner ............................ 200/61.34
   4,218,595  8/1980  Honjo ............................. 200/61.54
   4,277,658  7/1981  Delp et al. ....................... 200/61.54

Primary Examiner—Thomas J. Kozma
Assistant Examiner—Morris Ginsburg
Attorney, Agent, or Firm—Lane, Aitken & Kananen

[57] ABSTRACT

A device for mounting the column switches for vehicles fixes various kinds of unit type column switches for vehicles, for example, unit type turn signal switches, a wiper switch, a washer switch, and so forth on the base board fixed on the handle shaft of a vehicle. Guide projections are provided at both sides of the column switches for vehicles, while U-shaped depressions in which said column switches are fitted are provided on the base board. This depression has guide grooves at its side walls, and the guide projections are inserted into said guide grooves. Further, screw holes are arranged at a part of the column switches for vehicles or a part of said base board, while through holes are provided at a part of the base board or a part of the column switches for vehicles at the position which corresponds to and aligns with said screw holes. The column switches for vehicles can firmly be fixed on the base board by screwing a plurality of threaded rods into the screw holes while passing the rods through the through holes.

9 Claims, 4 Drawing Figures

STRUCTURE FOR MOUNTING COLUMN SWITCHES FOR VEHICLES

BACKGROUND OF THE INVENTION

1. Field of the Invention

This invention relates to a device for mounting column switches such as a turn signal switch, a wiper switch, and the like on a base board in a vehicle.

2. Description of the Prior Art

In the prior art, these kinds of column switches have been fixed by screws directly on the handle shaft tube or on the under surface of the column base board. Such a method for fixing switches by means of screws has made complex the work of mounting vehicle column switches and increased the man-hours required for installation. At the same time, there occurred variations in the mounting conditions of such column switches according to the workers' skill and it has been difficult to produce stable vehicle column switches with high quality.

There is available another mounting method for vehicle column switches, where U-shaped depressions are formed in the base board, wherein the column switches for vehicles such as a turn signal switch and a wiper switch are formed into a housing shape, and are fitted in the U-shaped depressions. The housing-shaped column switch for vehicles is provided with an engaging arm, which serves to engage the column switch with the U-shaped depression in the base board and fix it there through a single push action. In this method, an operating lever for the vehicle column switches is operated to control the functions of each switch. But repetitive use of the operating lever made the housing-shaped column switches unstable in the U-shaped depressions, and in the worst case, caused them to fall off from the depressions. Furthermore, this method had the problem that the engaging arm provided at the side surface of said column switch is easy to break, and made it impossible to fix said vehicle column switch to the bottom of the base board.

In order to fit in and securely engage the vehicle column switches with the U-shaped depressions in the base board, it is necessary to provide an engaging projection at each internal wall of the U-shaped depression and also at least one engaging arm on the side surface of the housing-shaped column switch for vehicles, which has complicated the molding process for the product and made the product very expensive.

SUMMARY OF THE INVENTION

This invention is made to solve the above-mentioned problems.

A principal object of this invention is to provide a device for mounting new and stable vehicle column switches by protrusively providing a tab having a through-hole on the left and right sides of a housing-shaped column switch, while opening a screw hole in the left and right sides of the base board surface part where the column switch contacts, and inserting the housing-shaped column switches into the U-shaped depressions provided in the base board, and further screwing a threaded rod into the screw hole on the contact surface through the openings of said tabs.

Another object of the invention is to provide a device for mounting column switches for use in vehicles, which enables it to easily and quickly install the column switches on the base board in vehicles.

Still other object of this invention is to provide a device for mounting the column switches for vehicles, by means of which it is easy to replace various kinds of vehicle column switches with new ones when they are out of order.

DESCRIPTION OF THE PREFERRED EMBODIMENT

Figure 1:
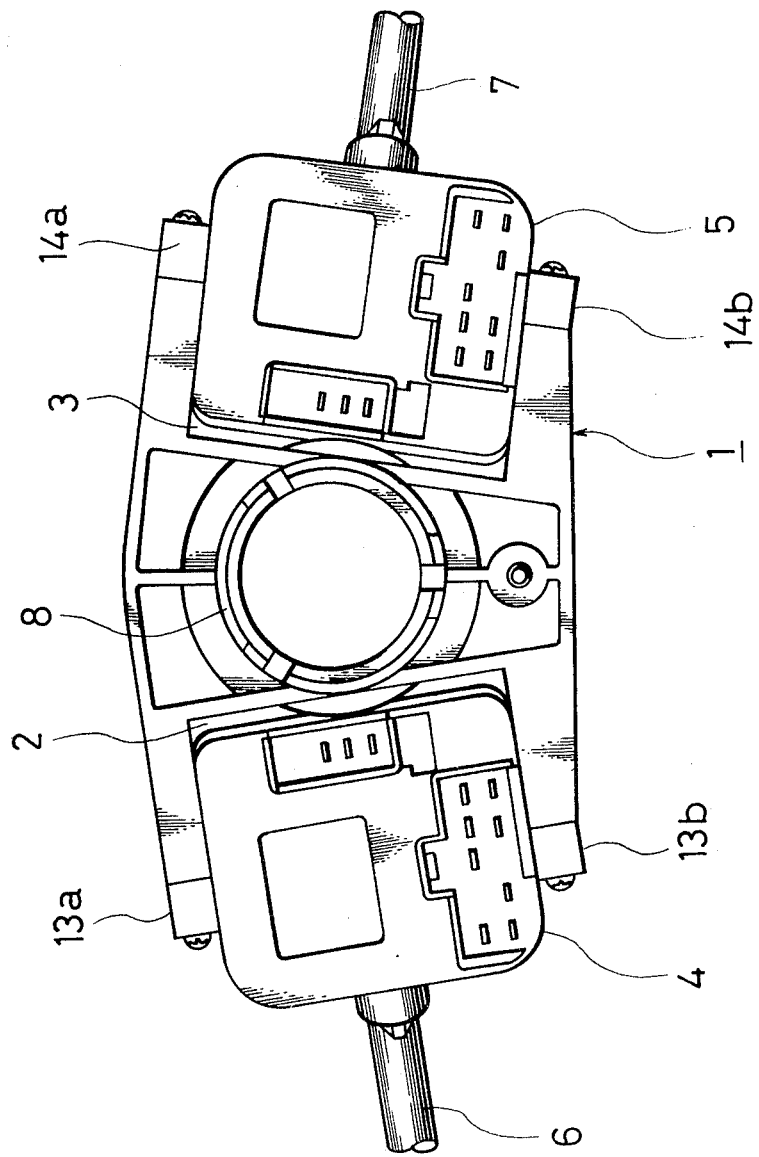
FIG. 1 shows the first embodiment of a device for mounting the column switches for vehicles according to this invention, and a plan view of the first and second column switches for vehicles fitted in the base board.

Now embodiments of a device for mounting the column switches for vehicles according to this invention will hereinafter be described in detail in reference to the accompanying drawings.

The reference numeral 1 denotes the base board mounted on the handle shaft of a vehicle. The base board 1 is molded from resin and has U-shaped depressions 2 and 3 on the left and right side thereof. Into the U-shaped depression 2 is inserted the first vehicle column switch 4 in which are incorporated, for instance, a turn signal switch and a dimmer switch. Into the U-shaped depression 3 is inserted the second vehicle column switch 5 in which are incorporated, for instance, a wiper switch, a washer switch, and so forth. The first and second vehicle column switches 4 and 5 are formed into a housing shape. The reference numeral 6 shows the operating lever for the first vehicle column switch 4, and the turn signal switch, dimmer switch and lighting switch can be operated by moving this operating lever to the left or right, or by turning it. The reference numeral 7 denotes the operating lever for the second vehicle column switch 5, and the washer switch, the wiper switch, and so forth can be operated by moving this operating lever 7 up and down, or left and right. The reference numeral 8 shows a cylindrical tube which is shaped integrally with nearly the center of the base board, and the handle shaft of a vehicle runs through this cylindrical tube 8. The numerals 9a and 9b show guide grooves arranged laterally on the left and right walls of the depression 2. The reference numerals 10a and 10b denote the guide grooves laterally provided on the left and right walls of the depression 3. Guide projections 11a and 11b are provided on the left and right walls of the first vehicle column switch 4. The guide projections 11a and 11b are respectively fitted in the guide grooves 9a and 9b provided on the depression 2 of the base board 1 and thus guide the insertion of the first vehicle column switch 4 into the depression 2. Guide projections 12a and 12b are arranged on the left and right wall parts of the second vehicle column switch 5. The guide projections 12a and 12b are fitted in the guide grooves 10a and 10b provided on the depression 3 of the base board 1, and thereby guide the insertion of the second vehicle column switch 5 into the depression 3. Tabs 13a and 13b are arranged on the left and right walls of the first vehicle column switch 4 and are formed above the guide projections 11a and 11b. The tabs 13a and 13b contact the walls of the left and right stepped sections 1a and 1b provided on the upper left-end surface of base board 1. Tabs 14a and 14b are arranged on the left and right walls of the second vehicle column switch 5, and are formed above the guide projections 12a and 12b. The tabs 14a and 14b contact the walls of the left and right stepped sections 1c and 1d provided on the upper right-end surface of the base board 1. Through holes 15a and 15b extend through the tabs 13a and 13b, while through holes 16a and 16b extend through the tabs 14a and 14b. Screw holes 1e and 1f are located in the walls of the stepped parts 1a and 1b, while screw holes 1g and 1h are similarly located in the walls of the stepped parts 1c and 1d. A threaded rod 17a is fixed by being screwed into the screw hole 1e via the through hole 15a of the tab 13a. A threaded rod 17b is fixed by being screwed into the screw hole 1f via the through hole 15b of the tab 13b. In this way, the vehicle column switch 4 is inserted into the depression 2 of the base board 1 and tightly fixed on the base board 1 by means of the threaded rods 17a and 17b. A threaded rod 18a is fixed by being screwed into the screw hole 1g via the through hole 16a of the tab 14a. Similarly, a threaded rod 18b is fixed by being screwed into the screw hole 1h via the through hole 16b of the tab 14b. In this way, the second vehicle column switch 5 is inserted into the depression 3 of the base board 1 and tightly fixed on the base board 1 by means of the threaded rods 18a and 18b.

Next the assembly procedure and use of the first embodiment of a device for mounting the column switches for vehicles in FIGS. 1 and 2 according to this invention will be explained.

The assembly worker holds the first vehicle column switch and inserts the guide projections 11a and 11b of the first column switch 4 into the guide grooves 9a and 9b on the depression 2 of the base board 1. When the first vehicle column switch 4 is fitted in the depression 2, the tabs 13a and 13b formed and arranged on the left and right walls of the first column switch contact the wall of the stepped parts 1a and 1b of the base board 1, and the through holes 15a and 15b of the tabs 13a and 13b become aligned with the screw holes 1e and 1f provided on the walls of the stepped parts 1a and 1b. The threaded rods 17a and 17b are inserted into the screw holes 1e and 1f via the through holes 15a and 15b, and the first vehicle column switch 4 is tightly fixed on the base board.

Further, the assembly worker holds the second vehicle column switch 5 and inserts the guide projections 12a and 12b of said second column switch 5 into the guide grooves 10a and 10b of the depression 3 of the base board 1. When the second vehicle column switch 5 is fitted in the depression 3, the tabs 14a and 14b formed and arranged on the left and right walls of the second vehicle column switch 5 contact the walls of the stepped parts 1c and 1d of the base board 1, and the through holes 16a and 16b of the tabs 14a and 14b become aligned with the screw holes 1g and 1h provided on the walls of the stepped parts 1c and 1d. The threaded rods 18a and 18b are screwed into the screw holes 1g and 1h respectively via the through holes 16a and 16b, and the second vehicle column switch 5 is tightly fixed on the base board 1.

When the operating lever 6 is turned counter-clockwise or clockwise, the turn signal switch is actuated to turn on and off the turn signal lamp on the left or right side of a vehicle, and indicate the turn direction of the vehicle. When the operating lever 6 is moved up and down, the dimmer switch is actuated to switch over the front lights from a high beam to a low beam, and vice versa. When said operating lever 6 is rotated about its axis, the lighting switch turns on and off to light up the lights intermittently. On the other hand, when the operating lever 7 is rotated counter-clockwise or clockwise, the wiper switch operates to select the operating speed of the wiper. When the operating lever 7 is moved up and down, the washer switch turns on and off to eject or stop the washer liquid.

Figure 3:
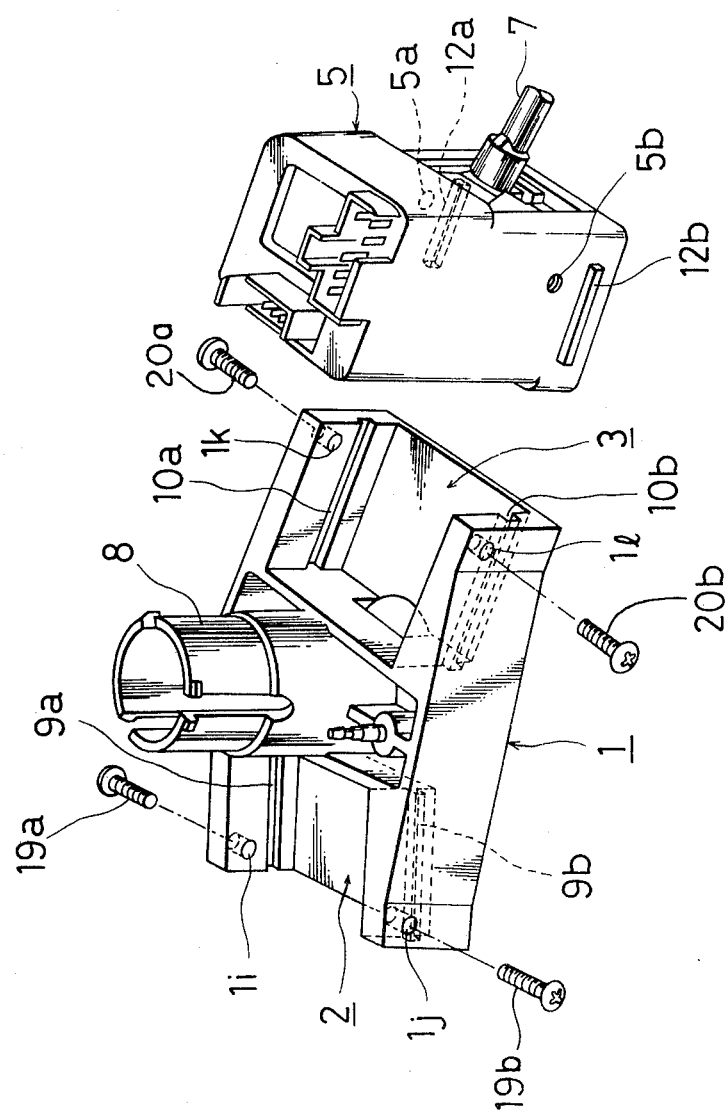
FIG. 3 shows an exploded perspective view of a second embodiment of a device for mounting the vehicle column switches according to this invention.

FIG. 3 shows the second embodiment of a device for mounting the column switches for vehicle according to this invention, which will hereinafter be explained. Screw holes 5a and 5b are provided in the left and right walls of the second vehicle column switch 5 and arranged above the guide projections 12a and 12b. Through holes 1i and 1j are located in one end of the base board 1 and in the upper part of and transverse to the guide grooves 9a and 9b. Similarly, through holes 1k and 1l are located in the other end of the base board 1 and in the upper part of and transverse to the guide grooves 10a and 10b. The through holes 1i and 1j are located at those positions to align with the screw holes arranged on the left and right walls of said first vehicle column switch 4 (not shown in FIG. 3, but like those shown in switch 5) and above the guide projections 11a and 11b thereon. The through holes 1k and 1l are located at those positions to align with the screw holes 5a and 5b of the second vehicle column switch 5. Threaded rods 19a and 19b are provided for securing the first column switch 4 to the base board 1. The threaded rod 19a is fixed by being screwed into one screw hole (not shown in FIG. 3) of the first vehicle column switch 4 through the through hole 1i. The threaded rod 19b is fixed by being screwed into the other screw hole (not shown in FIG. 3) of the first vehicle column switch 4 via the through hole 1j. Threaded rods 20a and 20b are provided for securing the second column switch 5 to the base board 1. The threaded rod 20a is fixed by being screwed into one screw hole 5a of the 2nd vehicle column switch 5 via the thru-hole 1k. The threaded rod 20b is fixed by being screwed into the other screw hole 5b of the second vehicle column switch 5 via the through hole 1l.

Figure 2:
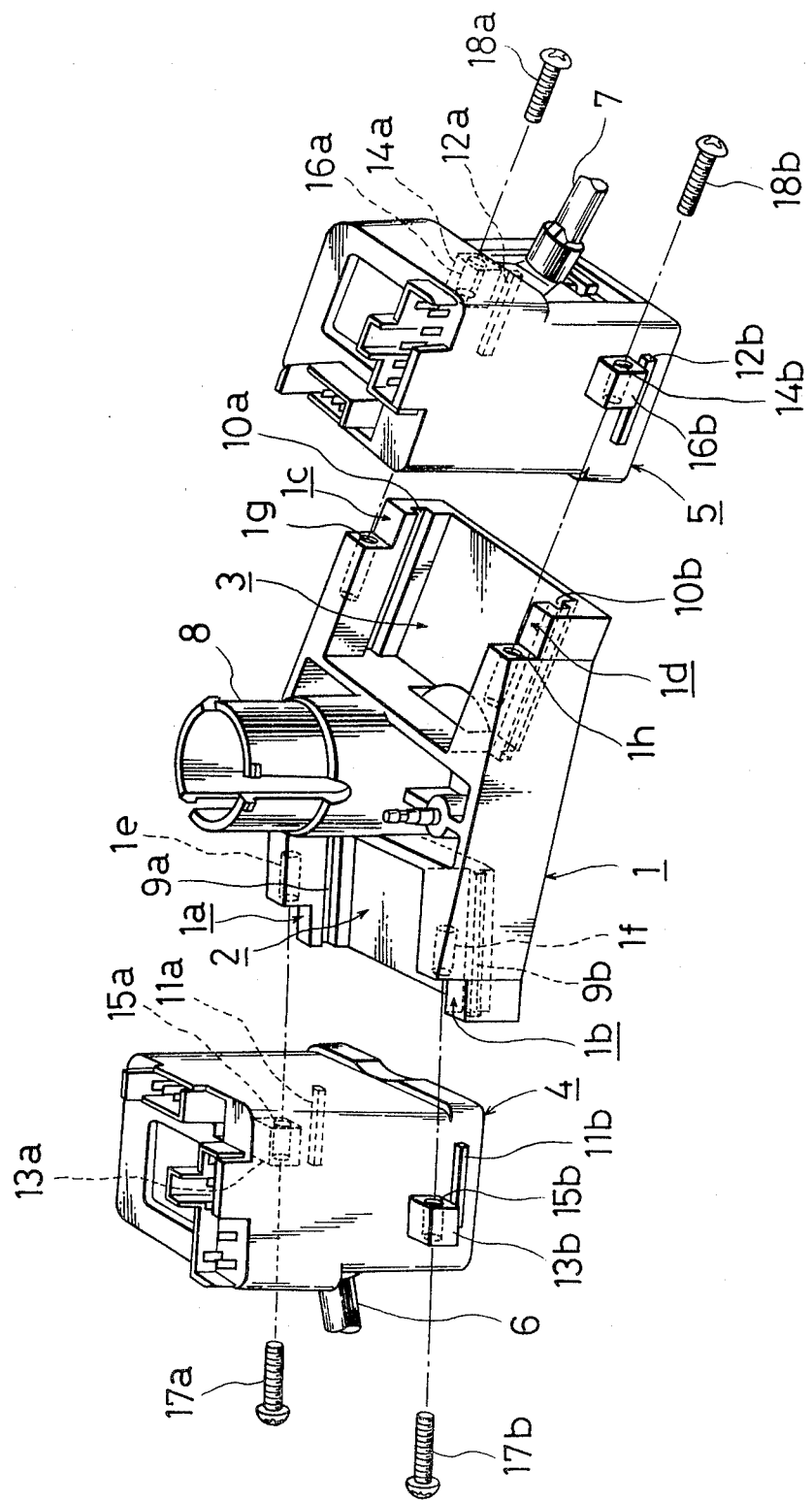
FIG. 2 shows a perspective view of the conditions where the first and second vehicle column switches in FIG. 1 are removed from the base board.

The second embodiment of a device for mounting the column switch for vehicles according to this invention makes unnecessary the tabs 13a, 13b, 14a and 14b provided in the first embodiment as shown in FIGS. 1 and 2. The other components are the same as those of the first embodiment; thus, a detailed explanation is omitted.

The assembly procedure of the second embodiment of a device for mounting the vehicle column switches according to this invention will hereinafter be explained referring to FIG. 3.

The assembly worker holds the second vehicle column switch 5 and inserts the guide projections 12a and 12b of the second vehicle column switch 5 into the guide grooves 10a and 10b on the depression 3 of the base board 1. Thus the second vehicle column switch 5 is fitted in the depression 3. Then the threaded rods 20a and 20 b are respectively screwed into the screw holes 5a and 5b of the second vehicle column switch 5 while passing them respectively through the through holes 1k and 1l. Thus the second vehicle column switch 5 is firmly fixed on the base board 1.

The first vehicle column switch 4 is also fixed on the base board 1 in the same way as the switch 5 as mentioned above.

The explanation of the switch in the second embodiment is omitted as it is identical with that of the first embodiment.

Next the assembly procedure of the third embodiment of a device for mounting column switches for vehicle according to this invention will be explained.

Figure 4:
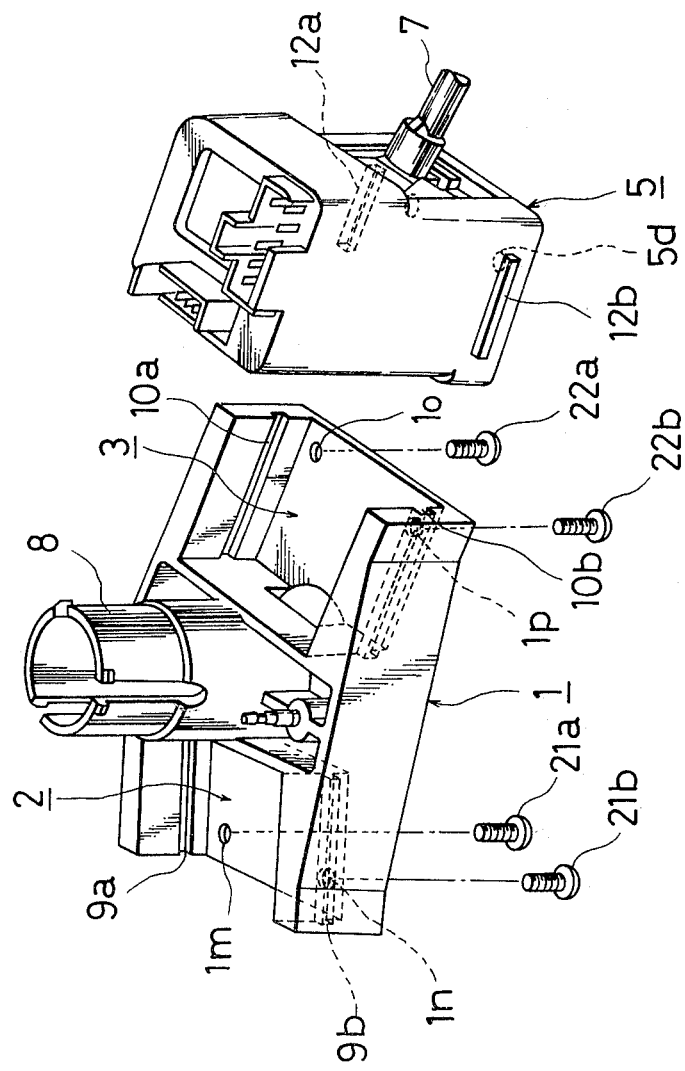
FIG. 4 shows an exploded perspective view of a third embodiment of a device for mounting the vehicle column switches according to this invention.

An assembly worker holds the second vehicle column switch 5 and inserts the guide projections 12a and 12b of the column switch 5 into the guide grooves 10a and 10b on the depression 3 of the base board 1, referring to FIG. 4. Then the second vehicle column switch 5 is fitted in the depression 3. Next the threaded rods 22a and 22b are screwed into the screw holes (not shown) in the the second vehicle column switch 5 while passing through the thru-holes 1o and 1p of the base board 1. Thus the second vehicle column switch 5 is firmly fixed on the base board 1.

The first vehicle column switch 4 can also be fixed on the base board 1 by the same procedure as mentioned above.

In the third embodiment, the action of each switch is the same as in the first embodiment and so its explanation is omitted.

The device for mounting the column switches for vehicle according to this invention has the above-mentioned construction and functions. It has the following effects.

Namely guide projections are formed on both side walls of the first and second vehicle column switches, while guide grooves into which the guide projections are inserted are arranged on the internal walls of the depressions of the base board. Screw holes (or through holes) are provided at a part of the first and second vehicle column switches while through holes or screw holes are arranged on the base board side, and the threaded rods are inserted into the screw holes and can firmly fix the the first and second column switches on the base board.

And even if the operation lever is used for a long period of time, the vehicle column switches fitted in the depressions of the base board remains stable in the depressions and secure the stable switch functions.

According to this invention, the vehicle column switches can removably be mounted on the base board, the switches can readily be replaced with new ones if they are out of order and assembly work can be simplified. There are further various effects such as the product quality is stabilized and the productivity can be improved.

I claim:

1. A mounting structure for mounting a column switch on a handle shaft of a vehicle, comprising the combination of:
   a base board defining at least one generally U-shaped depression therein formed by a bottom member and a pair of opposed side walls, each having an inner side and an outer side, generally outwardly extending from said base board when said base board is fixed on the handle shaft of the vehicle, said depression being structurally adapted to receive a column switch therein, the inner sides of each of said side walls of said depression defining guide grooves on opposed interior portions thereof located so as to face each other inwardly, said U-shaped depression further having at least one opening therein for receiving a fastening member;
   a column switch which includes a housing defined at least by opposed left and right walls thereof, and including guide projections on the respective left and right walls thereof for engaging said guide grooves in said U-shaped depression when said column switch is inserted in said U-shaped depression, said switch further defining at least one opening therein located in register with the opening in said U-shaped depression when said column switch is located therein, for also receiving said fastening member; and
   a fastening member extending through one of either of said opening in said U-shaped depression or said opening in said switch to engage securely the other of said openings,
   whereby said column switch is securely fixed by said fastening member to said base board.

2. The structure as set forth in claim 1, wherein at least a pair of through openings are provided in said U-shaped depression in the opposed side walls thereof and extending therethrough, said through openings extending transversely through each of the opposed sidewalls of said U-shaped depression, said column switch defining a like pair of threaded openings in opposed left and right walls of said switch for respectively receiving ends of a pair of threaded members constituting fastening members therein, said threaded members respectively passing through said through openings in the walls of said U-shaped depression to engage said threaded openings in said column switch.

3. The structure as set forth in claim 1, wherein said opening in said U-shaped depression is a through opening which extends through said bottom member of said depression, said column switch defining a like threaded opening in a lower surface thereof for receiving an end of a threaded member constituting said fastening member therein, said threaded member passing through said through opening in the bottom member of said U-shaped depression to engage said threaded opening in said column switch.

4. The structure as set forth in claim 3, wherein a pair of through openings are provided in said bottom member of said U-shaped depression, said column switch defining a like pair of threaded openings in a lower surface thereof for receiving respective ends of a pair of threaded members constituting fastening members, respectively passing through the through openings in the bottom member of said U-shaped depression to engage said threaded openings in said column switch.

5. The structure as set forth in claim 1, wherein said column switch further includes a pair of tabs respectively arranged on the opposed walls of said column switch and located above the guide projections thereon; said base board further defines respective stepped sections at respective outer ends of said side walls of said depression, located to engage respectively with said tabs when said column switch is inserted in said base board, the opening in said column switch being defined by through openings in each of said tabs and extending therethrough, the openings in said base board being defined by threaded openings provided laterally in the stepped sections of the walls of said U-shaped depression and arranged to receive respective ends of fastening members passing through said tabs.

6. The structure as set forth in claim 1, wherein said column switch further includes at least one tab arranged on a wall of said column switch and located above the guide projection thereon, said base board further defines a stepped section at an outer end of a side wall of said U-shaped depression, located to engage with said tab when said column switch is inserted in said base-board, the opening in said column switch being a through opening and provided through said tab, the opening in said base board being threaded and provided laterally in the stepped section of the wall of said U-shaped depression and arranged to receive an end of a threaded fastening member therein after the threaded fastening member passes through the through opening in the tab.

7. A mounting structure for mounting column switches on a handle shaft of a vehicle, comprising:

a base board defining a first and second generally U-shaped depression therein, oppositely located respectively on a left hand portion and a right hand portion of the base board when the base board is fixed about the handle shaft of the vehicle, each of said first and second depressions being structurally adapted to receive a first and a second vehicle column switch respectively therein; the first column switch defining opposed left and right exterior walls including an operative member for controlling the operation of at least one electrically operative device on said vehicle, the second column switch including an operative member for controlling the operation of at least one other electrically operated device on said vehicle, each of said first and said second depressions including guide grooves arranged laterally on opposed left and right interior walls of the respective first and second depression; guide projections provided on opposed left and right exterior walls of each of said first and second switches, located so that when said first and said second column switches are respectively fitted in said first and second depressions, the guide grooves guide the respective switches into a secure engagement in said depressions; tabs arranged on the respective left and right walls of said first and second column switches and located thereon above the guide projections thereon to engage corresponding stepped sections on upper right end surfaces of the base board, each of said tabs including through holes extending therethrough; and fastening means projecting through said through holes in said tabs for engaging said baseboard so that when said first and second switches are located in said first and said second depressions, said switches are tightly fixed to said base board.

8. The structure as set forth in claim 7, wherein said fastening means is a threaded rod engaging a threaded opening in said base board.

9. The structure as set forth in any one of claim 1 to 7, wherein each column switch is formed into a housing shape.

* * * * *